United States Patent
Srinivasan et al.

(10) Patent No.: US 10,607,496 B2
(45) Date of Patent: Mar. 31, 2020

(54) SYSTEM AND METHOD TO ASSIST PILOTS IN DETERMINING AIRCRAFT PHASE TRANSITION TIME BASED ON MONITORED CLEARANCE INFORMATION

(71) Applicant: HONEYWELL INTERNATIONAL INC., Morris Plains, NJ (US)

(72) Inventors: Narayanan Srinivasan, Tamil Nadu (IN); Hariharan Saptharishi, Tamil Nadu (IN); Gobinathan Baladhandapani, Tamil Nadu (IN); Syed Hakkim, Tamil Nadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 165 days.

(21) Appl. No.: 15/949,496

(22) Filed: Apr. 10, 2018

(65) Prior Publication Data
US 2019/0311638 A1  Oct. 10, 2019

(51) Int. Cl.
  *G08G 5/00* (2006.01)
  *G10L 15/22* (2006.01)
  *G10L 15/18* (2013.01)
  *G10L 15/08* (2006.01)

(52) U.S. Cl.
  CPC ......... *G08G 5/0078* (2013.01); *G08G 5/0004* (2013.01); *G08G 5/0021* (2013.01); *G10L 15/1815* (2013.01); *G10L 15/22* (2013.01); *G10L 2015/088* (2013.01)

(58) Field of Classification Search
  CPC .. G08G 5/0078; G08G 5/0004; G08G 5/0021; G10L 15/1815; G10L 15/22; G10L 2015/088
  See application file for complete search history.

(56) References Cited

U.S. PATENT DOCUMENTS

| | | |
|---|---|---|
| 5,265,023 A | 11/1993 | Sokkappa |
| 5,526,265 A | 6/1996 | Nakhla |
| 5,842,142 A | 11/1998 | Murray et al. |

(Continued)

FOREIGN PATENT DOCUMENTS

| | | |
|---|---|---|
| EP | 2077437 A2 | 7/2009 |
| EP | 3205980 A2 | 8/2017 |

(Continued)

*Primary Examiner* — Calvin Cheung
(74) *Attorney, Agent, or Firm* — Lorenz & Kopf, LLP

(57) ABSTRACT

Methods and systems are provided determining airport operations based on radio communications, the method includes: configuring a receiver of an aircraft to scan communication channels of different radio frequencies related to transmissions between air traffic control (ATC) and a set of aircrafts to determine one or more communication channels associated with the set of aircrafts in a coverage area to enable the receiver to monitor and receive air traffic control (ATC) communications of the set of aircraft; and processing, by a conversation extractor unit, the ATC communications to extract clearance information in the ATC communications, and to associate the clearance information with an identifier with each aircraft to create a table of timings of the clearance information to a particular aircraft with the identifier providing a view of airport operations.

20 Claims, 7 Drawing Sheets

(56) References Cited

U.S. PATENT DOCUMENTS

| | | | | |
|---|---|---|---|---|
| 6,160,497 A | * | 12/2000 | Clark | G01S 7/04 |
| | | | | 340/945 |
| 7,698,025 B1 | * | 4/2010 | Cornell | G01C 23/00 |
| | | | | 244/75.1 |
| 8,565,944 B1 | | 10/2013 | Gershzohn | |
| 8,629,787 B1 | * | 1/2014 | Rathinam | G08G 5/0013 |
| | | | | 340/963 |
| 8,666,649 B2 | | 3/2014 | Otto et al. | |
| 8,676,481 B2 | | 3/2014 | Coulmeau et al. | |
| 9,076,327 B1 | * | 7/2015 | Baiada | G08G 5/0091 |
| 9,884,690 B2 | | 2/2018 | Moravek et al. | |
| 2005/0071076 A1 | | 3/2005 | Baiada et al. | |
| 2010/0030400 A1 | * | 2/2010 | Komer | G10L 15/26 |
| | | | | 701/3 |
| 2013/0238279 A1 | * | 9/2013 | Schmier, II | G01S 7/40 |
| | | | | 702/150 |
| 2015/0348422 A1 | * | 12/2015 | Agrawal | G08G 5/0095 |
| | | | | 701/120 |
| 2016/0004969 A1 | * | 1/2016 | Cetinich | G06N 20/00 |
| | | | | 706/11 |
| 2016/0210868 A1 | * | 7/2016 | Donovan | G08G 5/0043 |
| 2016/0275801 A1 | * | 9/2016 | Kopardekar | G08G 5/0043 |
| 2017/0221369 A1 | | 8/2017 | Bilek et al. | |
| 2017/0295031 A1 | * | 10/2017 | Bush | H04L 43/08 |
| 2018/0137766 A1 | * | 5/2018 | Bostick | G06Q 50/30 |

FOREIGN PATENT DOCUMENTS

| | | | |
|---|---|---|---|
| WO | 0146886 | A2 | 6/2001 |
| WO | 2014115139 | A1 | 7/2014 |

* cited by examiner

| APT | Enroute | Hold | Arrival | Taxi | Total |
|---|---|---|---|---|---|
| KDVT | 1:30:20 | 0:45:00 | 0:10:00 | 0:05:00 | 2:30:20 |
| KRNT | 1:40:10 | 0:30:00 | 0:15:35 | 0:25:00 | 2:50:45 |
| KSEA | 1:25:40 | 0:00:00 | 0:05:00 | 0:12:00 | 1:42:40 |
| KPWT | 1:10:20 | 0:20:00 | 0:13:00 | 0:10:00 | 1:53:20 |

FIG. 2

| Airport - DeerValley (KDVT) | | | | | | |
|---|---|---|---|---|---|---|
| Landing Statistics (Current) | | | | | | |
| Cleared to | Hold | Long Final | Final | Short Final | Land | Go Around | Total |
| # Aircrafts | 2 | 5 | 3 | 2 | 2 | 1 | 15 |
| Average Time | 8 secs | 5 mins | | | 3 mins | 1 min 43 secs | |
| Notes | Charlie 07 Taxiway for RWY 07R<br>RNAV RWY 25L - 3 aircrafts<br>RNAV RWY 7R - 3 aircrafts | | | | | | |

FIG. 6

SYSTEM AND METHOD TO ASSIST PILOTS IN DETERMINING AIRCRAFT PHASE TRANSITION TIME BASED ON MONITORED CLEARANCE INFORMATION

TECHNICAL FIELD

Embodiments of the subject matter described herein relate generally to avionic systems and more particularly to methods and systems to provide more contextual and accurate phase transition information and operational models of multiple aircraft and airport facilities at various times during departure and arrival of the aircrafts at an airport based solely on monitoring radio communications for clearance information received by each of the aircraft at the airport.

BACKGROUND

When an aircraft is reaching a destination point for an arrival at an airport, during this last flight phase, a missed approach may occur or the aircraft may be placed in a holding pattern based on clearance instructions. When these changes in flight plan occur, the pilot's attention or focus will often be directed to making, during the changes in the flight phase, determinations or decisions of the amount of fuel and corresponding flight time available to enable the aircraft to proceed, if needed too, to an alternate airport(s) safely with an appropriate amount of reserve fuel to spare. For example, an amount of fuel that is over and above the bingo fuel (i.e. enough fuel to arrive at the destination) is generally appropriate to be used safely to remain in a holding pattern and also to determine the appropriate and safe wait times, if needed, for flight conditions to improve or to change. Assuming there is extra fuel to burn, it is beneficial for a pilot to know the reason(s) for the hold and further how likely, if the hold is based on dynamic factors like the load (i.e. current queue of aircrafts) awaiting instructions by the air traffic control (ATC) and/or the slots available at the airport or at possible alternate airports. This results in the inability of the pilot to determine how much wait time is anticipated or required for landing at the airport of the alternate airport and to calculate an allotted time based on the amount of fuel to complete safely an eventual landing of the aircraft. For example, if there is only 15 minutes of hold fuel in the fuel tanks of the aircraft and the current queue at the airport is not expected to clear for at least 30 minutes, then the pilot may want to or is provided with a basis to make an immediate decision to elect to divert the aircraft to an alternate airport earlier which in turn increases the envelope of safety to consummate a safe landing operation.

It is desirable to provide methods and systems based on clearances that reduce the workload of the pilot and a flight dispatcher or controller to predict the timing required that may have an effect on instructed aircraft flight clearances to land, to periods of phase transitions from a holding pattern to a landing phase at the planned airport and to diversions of the aircraft to alternate airports. The present disclosure addresses at least this need.

BRIEF SUMMARY

Methods and systems to put forth more contextual and accurate phase transition information of multiple aircraft at a departure/arrival point based solely on monitoring radio communications for clearance information received by each of the aircraft at the departure/arrival point is provided.

In an exemplary embodiment, A method for more determining airport operations based on radio communications is provided. The method includes: configuring a receiver of an aircraft to scan communication channels of different radio frequencies related to transmissions between air traffic control (ATC) and a set of aircrafts to determine one or more communication channels associated with the set of aircrafts in a coverage area to enable the receiver to monitor and receive air traffic control (ATC) communications of the set of aircraft; and processing, by a conversation extractor unit, the ATC communications to extract clearance information in the ATC communications, and to associate the clearance information with an identifier with each aircraft to create a table of timings of the clearance information to a particular aircraft with the identifier providing a view of airport operations.

The method further includes: determining, by a context generator processing unit, either a flight phase of each aircraft or a time spent in a flight phase based on contextual processing of the clearance information in order to determine at least a current flight phase of the aircraft. The context generator processing unit further includes: calculating the transition times of a particular flight phase based on the time spent in a particular flight phase. The context generator processing unit further includes: executing a start and a stop action of a timer based on trigger words to measure transition times wherein the trigger words are semantically processed from the clearance information. The context generator processing unit further includes: averaging transition times to display likely or a best fit transition time for a particular transition phase. The transition times include at least one or more of a set of departure or arrival clearance information of aircrafts related to airport operations. The arrival transition times include: at least one or more of a set of transition times related to hold, final, and go around clearance information. The takeoff transition times includes: at least one or more of a set of transition times related to taxi, runway, and cleared to takeoff clearance information. The context information includes: descriptive operational context information of the vicinity wherein the vicinity comprises: a destination or departure airport and alternate destination airports. The method includes: displaying, by a graphic user interface, the identifier of each aircraft of the set of aircrafts, and associated flight phase, current transition time, expected transition time, and best fit transition time to enable comparisons of transition time of flight phases of the set of aircrafts.

In another embodiment, a system for determining airport operations based on radio communications is provided. The system includes: a receiver of an aircraft configured to scan communication channels of different radio frequencies related to transmissions between air traffic control (ATC) and a set of aircrafts to determine one or more communication channels associated with the set of aircrafts in a coverage area, and to monitor and receive air traffic control (ATC) communications of the set of aircraft; and a conversation extractor unit configured to process the ATC communications, to extract clearance information in the ATC communications, and to associate the clearance information with an identifier with each aircraft to create a table of timings of the clearance information to a particular aircraft with the identifier in order to provide a view of airport operations based on the clearance information.

The system further includes: the context generator processing unit configured to perform the operations of: determining either a flight phase of each aircraft or a time spent in a flight phase based on contextual processing of the clearance information in order to determine at least a current flight phase of the aircraft. The system further includes: the context generator processing unit configured to perform the operations of: calculating the transition times of a particular flight phase based on the time spent in a particular flight phase. The system further includes: the context generator processing unit configured to perform the operations of: averaging transition times to display likely or a best fit transition time for the particular transition phase. The arrival transition times include: at least one or more of a set of transition times related to hold, final, and go around clearance information.

The context information includes: descriptive operational context information of the vicinity wherein the vicinity includes: a destination or departure airport and alternate destination airports. The system includes: a display unit configured to perform the operations of: displaying, by a graphic user interface, tail information of each aircraft of the set of aircraft, and associated flight phase, current transition time, expected transition time, and best fit transition time to enable comparisons of transition time of flight phases of the set of aircraft.

A non-transitory computer-readable medium storing a computer program product executable by a processor of a computer system for processing an object request, the non-transitory computer-readable medium is provided. The computer program product includes: code for configuring, a receiver of an aircraft, to scan multiple communication channels of different radio frequencies related to transmissions between air traffic control (ATC) and a set of a plurality of aircrafts to determine one or more communication channels associated with the set of aircrafts in a coverage area to enable the receiver to monitor and receive air traffic control (ATC) communications of the set of aircrafts; code for processing, by a conversation extractor unit, the ATC communications to extract clearance information in the ATC communications, and to associate with an identifier with each aircraft to create a table of timings of the clearance information to a particular aircraft identified by the identifier; code for determining, by a context generator processing unit, a flight phase of each aircraft based on transition times and by contextual processing of the clearance information; and code for presenting, by a display unit, a view of each flight phase and transition time with context information about the flight phase in the coverage area.

The computer program product includes: code for calculating the transition times based on a receipt time processed from the clearance information matched with transition time periods of a pre-built timer table; code for determining a flight phase based on contextual processing of at least the clearance information which has extracted; code for calculating transition times based on a receipt time extracted from the clearance information correlated with transition time periods of the pre-built timer table, and a start/stop time by a timer based on trigger words related to transition times in the flight phase extracted from the clearance information; code for deriving statistical data of prior recorded historic transition times within the coverage area; code for correlating calculated transition times and recorded historic transition times for a best fit transition time; and code for deriving other statistical data not limited to a number of aircrafts in different flight phases. The computer program product includes: code for deriving flight phases which are instructed by air traffic control; code for deriving flight phases which have not been instructed by the air traffic control; code for deriving analytics of communications with the air traffic control; code for deriving analytics of runways used, taxiways used, time in the runways and taxiways; code for deriving radio frequencies used by aircrafts for different flight phases of flight; code for deriving prediction data of cleared arrival routes, departure routes, and taxi routes; code for deriving waiting time to receive clearance information for a gate, a taxi, a takeoff, and a landing; code for predicting one or times related to transitions of flight phases by associating a time period of the flight phase with a pre-built timer table of time periods for transition of each phase of a flight wherein the transitions of the flight phases comprise on or more of a set of flight phase of: waiting, holding and arrival flight phases; code for deriving occupancy rates of runways, taxiways and gates over a time period; and code for deriving segments of ground paths requiring permission to traverse.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures: and wherein:

FIG. 2 is a snapshot of a graphic user interface of an exemplary predictive phase transition time system in accordance with the disclosed embodiments;

FIG. 6 is an overlaid information box on a display diagram of an exemplary predictive phase transition time system in accordance with the disclosed embodiments.

DETAILED DESCRIPTION

Figure 1:
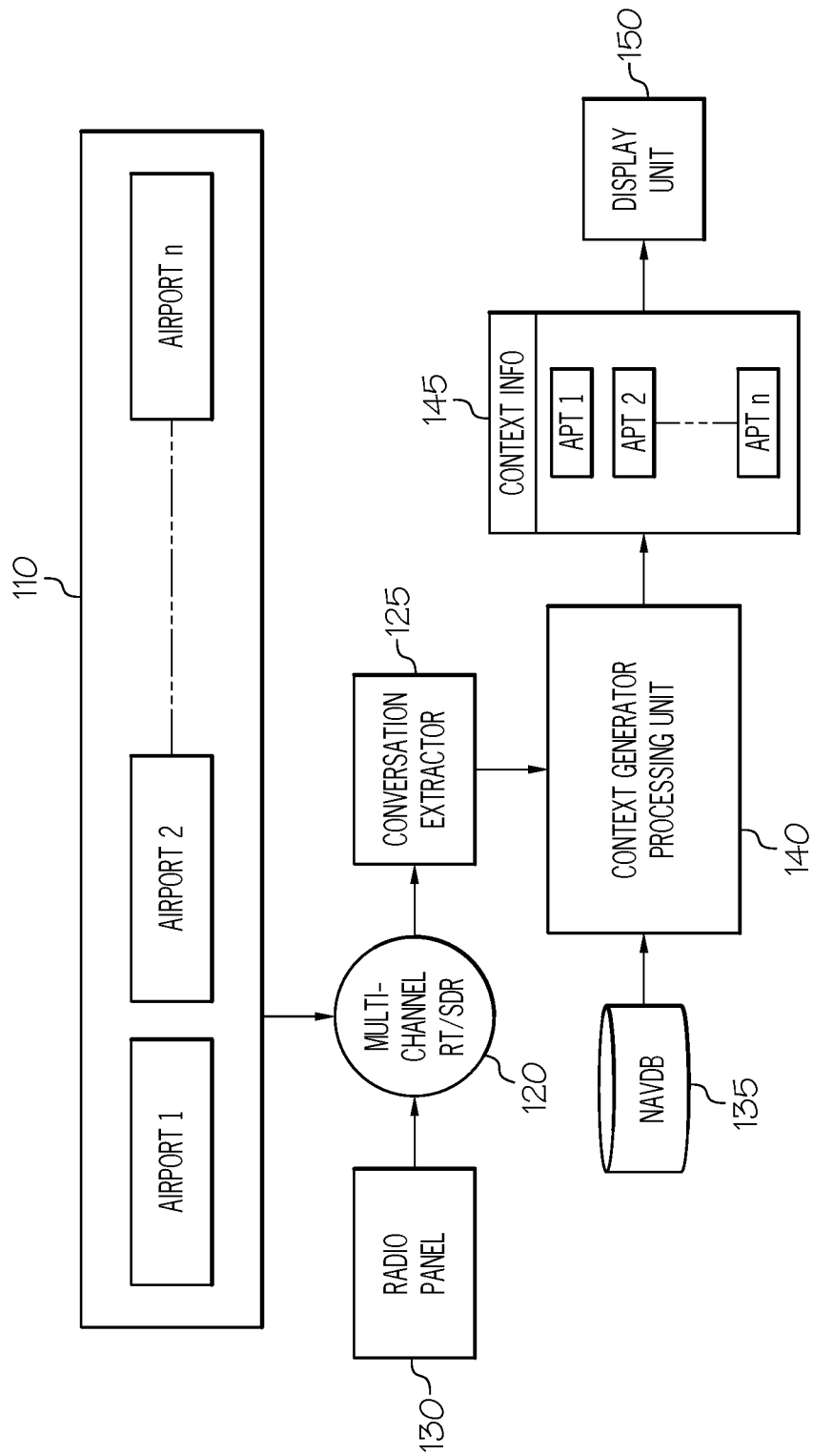
FIG. 1 depicts a block diagram of an exemplary predictive phase transition time system in accordance with the disclosed embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

During an initial holding clearance action, the Air Traffic Control (ATC) may issue an Expect Further Clearance (EFC) time to the pilot. However, the EFC can be misleading as the EFC may not always be an accurate indication of the actual holding time for the particular aircraft. Often, it is the case that the holding time will be shorter or significantly longer than the initial forecasted EFC. This is because the EFC known purpose has evolved; rather than to provide an accurate indication of a holding time, the EFC is now used to provide to the pilots a time to begin a "communication" procedure due to heavy traffic created out of an abnormal event in the airport, the controller becomes too busy to handle the traffic and hence ownship pilot has to spend lot of time and fuel before getting know the exact situation and details to plan his alternate. In other words, because of the inaccuracy of the EFC forecast time, the EFC primary purpose has changed to provide not a forecast of the anticipated hold time but the time or moment when the pilot needs to begin a communication protocol to get clearance instructions due to heavy traffic created out of an abnormal event in the airport.

When performing the communication procedure, the pilots will attempt to contact the dispatcher assigned to the particular flight to discuss amounts of remaining fuel and fuel requirements to validate that a planned alternate routing is still a viable safe option based on expected fuel consumptions of the aircraft. The air traffic controller is currently better able to weigh the feasibility of options available because, contrary to the view of the pilot of other aircraft phases in the vicinity which is limited, the air traffic controller will have a comprehensive picture of the phases of all of the current flights in the vicinity. Furthermore, the air traffic controller will be able to ascertain weather conditions and the air traffic on a much larger scale than the pilot presently is able. For example, the air traffic controller will be provided with the knowledge of which aircraft are currently in a holding pattern, the locations of the holding pattern, and the order of clearances for each of the aircraft out of the holding patterns. Armed with this information, the air traffic controller is in a better position than pilot to dispense the appropriate advice such as for flight clearances.

It is therefore desirable to a have system and method that counters the lack of information available to the pilot when trying to validate alternate routing by providing information of a comprehensive picture of all phases of current flights in the vicinity so the pilot is able to weigh a decision based on similar knowledge possessed by the air traffic controller.

It is therefore desirable to have a system and method provided to the pilot which monitors ATC communications and analyzes voice conversations, ATC instructions, and clearances issued in the communications to determine the phases and phase transitions and the timing required for the aircraft phase transitions from all the monitored air traffic communications in order to provide a complete view of all the estimates of times for phase transitions for each aircraft during an arrival or departure from an airport.

It is also desirable to have a system and method for more better timing measurements and assessments of each of the phase transitions (initial contact, approach, finals, long final, short final, landing, taxi, gate, departure, climb) and further to provide the operational context of the aircraft and the involved airport based on the clearances issued by the ATC and substantiated in part by other data available in the cockpit to the pilot and controller.

In addition to deriving the timing data for phase transitions, it is desirable for the system and method to generate additional contextual information about the airport by feature extraction (used runway, runway incursions, commonly used approach, frequency congestion, commonly used taxiway path, monitoring various conversation happenings) when processing the clearance information to provide to the pilot and the controller.

FIG. 1 depicts a block diagram of an exemplary predictive phase transition time system in accordance with the disclosed embodiments. FIG. 1 includes a multi-channel remote terminal software defined radio (RT/SDR) receiver 120 for monitoring conversations about air traffic through radio communications. In addition, the multi-channel RT/SDR receiver 120 receives control inputs from a radio panel 130 which may include settings for a monitor mode to allow the pilot to hear the active and stand-by frequencies simultaneously and to store discrete radio frequencies in non-volatile memory (not shown) for quick dial up. Also, the voice and data communications may be received from back-and-forth communications between ground controllers at various airports 110 and aircraft in the vicinity. Additional substantiating data may be received, in instances, from data communications via a controller-pilot data-link communication (CPDLC) system between the airports 110 and the predictive phase transition time system of the aircraft. The CPDLC system is a tool that allows pilots and controllers to exchange messages via specially designated data links.

The audio or voiced air traffic communications received by the multi-channel RT/SDR receiver 120 are sent to a conversation extractor processing unit 125. The conversation extractor processing unit 125 include processors of a voice recognizer (not shown) for speech recognition and may provide voice recognition functions to convert voice transmissions to text. The conversation extractor processing unit 125 may perform natural language processing ("NLP") using various software solutions of received audio or voice transmission. Next, a context generator processing unit 140 is provided for receiving outputs from the conversation extractor processing unit 125. The context generator processing unit 140 may include solutions for semantic contextual interpretations of the voice transmissions and for appending and aggregating to other text messages or flight data. The context generator processing unit 140 also receives input data from a navigation database 135. The context generator processing unit 140 determines the tail information for a particular aircraft and matches, links or associates the tail information in a table to the clearance information. In alternative embodiments, the generated tables may be linked tables that are linked by timing or tail information, the clearance information for particular aircraft.

In various embodiments, the context generator processing unit 140 may generate content information 145 which may include alternate destination points and corresponding time data such as in-route data times, hold times, arrival times, and taxi times in a prioritized list of alternative destination points. This content information is sent to a display unit 150.

In various embodiments, the context generator processing unit 140 may determine the transition times in each phase by further processing to a best fit transition time, or an average transition time for a particular transition phase and in addition use historical information from recorded or stored transition times by various applications solutions to aid in such determinations.

FIG. 2 is a snapshot of a display of the of an exemplary predictive phase transition time system in accordance with the disclosed embodiments. The display is a user interface and in various embodiments may include selectable tabs (not shown) of various alternate destination points of the airports of "KDVT", "KRNT", "KSEA", and "KPWT" which are associated within a vicinity or region of interest of the aircraft's current or expected destination location; which upon selection by the user enables more detailed information about a particular airport destination. There may also be included an import function (not shown) for importing flight plan data and selectable buttons (not shown) for displaying determinations of alternate destination points. The alternate destination points 215 include in-route times, hold times, arrival times, taxi times and total times which are associated with each alternate destination airport 220 so that the pilot can make immediate visual comparisons. The timing data is presented in real-time and is constantly changing as the aircraft proceeds on route.

Figure 3:
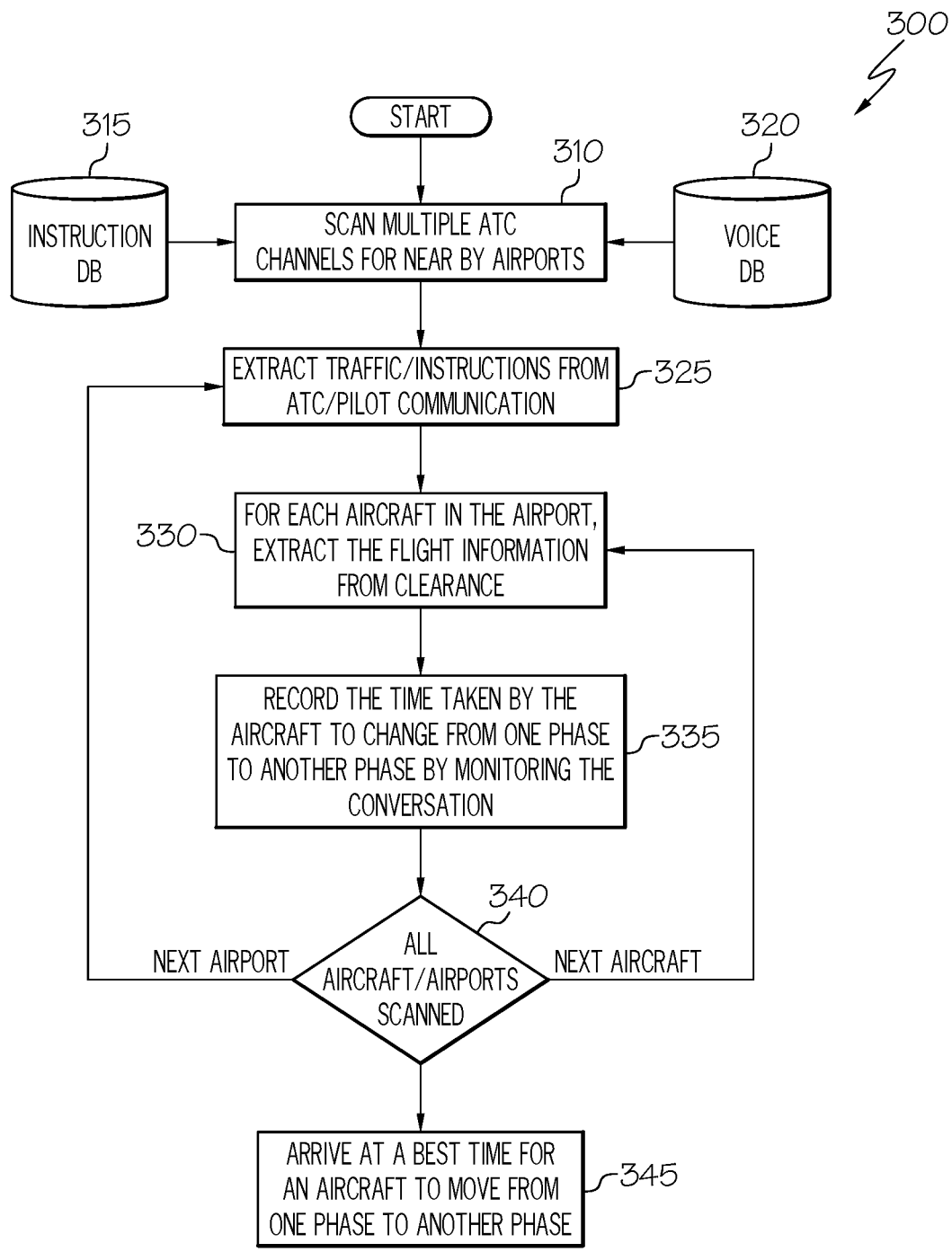
FIG. 3 is a flowchart of the process of an exemplary predictive phase transition time system in accordance with the disclosed embodiments.

FIG. 3 is a flowchart of the process of the predictive phase transition time system in accordance with the disclosed embodiments. The flow process of FIG. 3 is described in conjunction with the components of FIG. 1. Initially, at 310, of the flowchart 300, a scan of the multiple ATC channels for nearby airports is performed using the multi-channel RT/SDR receiver 120. At 315, instructions which are stored in the instruction database are sent to the multi-channel RT/SDR receiver 120. At 320, voice commands from a voice command database are sent to aid in channel selection of the scanning operation for receiving ATC communications between all aircraft in the vicinity. Next, at 325, a context based filtering is performed on all the conversations based on the ATC communications that are available and the applicable clearances to the airport or other airports in the vicinity which are selected as the destination point airport are extracted or determined. From this context based filtering, appropriate traffic and instruction information is extracted based primarily on the ATC and pilot/ground controller communications. At 330, for each aircraft in the airport the flight information is extracted based on the clearance information. That is, the conversations or voice based communications of the airport of interest are processed to extract the clearance information from which the flight information for each aircraft is determined. The process includes: a first stage of separating the aircraft identification and the clearance information from ATC communication which have been received; a second stage of separating the takeoff and landing information along with feature extraction processing step; and a third stage of outputting data of summaries or statistics of the takeoff and landing data which has been determined, along with a summaries which include categorizations of corresponding timings of various aspects or phases of the ownship arrival or departure process at a determined destination point airport. Next, at 335, the time is recorded for the time taken by the aircraft to change from one phase to another phase by monitoring the conversations.

In an exemplary embodiment, a timer table is created by the context generator processing unit 140 in which the time taken for each aircraft to transition from one phase to another phase (e.g. descent, approach, approach to landing etc.) is recorded. The timer or time period for measuring each phase is commenced once the pilot is cleared by ATC communications for a certain phase. The timer is reset when the current phase changes by the particular aircraft; in this way a time period for each phase is recorded and a table of recorded time periods is formed. The clearances, which are voiced or are communicated by other digital means, are used as a trigger to identify the phase of the aircraft, which is used as a trigger to start and stop the timer measuring actions. Similar timer tables may also be created in real time, simultaneously or not, for all the other aircraft which are in the vicinity of the ownship by the monitoring and the continued monitoring of the conversations of pilots of the other aircraft with the ground controllers or other personnel.

At 340, a decision is made as to whether all the necessary aircraft and destination airports have been scanned and sufficient data has been received. If not, the flow reverts to 325 to scan for the next airport destination or to 335 to scan for the next aircraft. At 345, a best fit time is arrived statistically with the recorded time taken by all the aircraft and the expected time for the ownship arrival at the destination airport, which may be derived using various algorithmic solutions of the context generator processing unit 140. In addition, other parameters about the destination airports may be collected which may also assist in defining the context for the destination airport; for example contextual data of takeoff and arrival information for an aircraft.

In various exemplary embodiments, timing and transcripts of voiced communications are received. The voice communications are monitored continuously in real-time and a table of voiced communications is created and associated with a particular time. For each time, a corresponding aircraft tail and feature (determined by the conversation extractor processing unit 125 of FIG. 1) is associated to identify the aircraft and to provide a contextual framework of the state of the aircraft. As indicated by the table below (Table 1.1), for a particular tail, as monitored at different times, the feature extracted of the clearance text (by the conversation extractor processing unit 125) is changed and provides a moment-by-moment picture of the aircraft instructed clearances based on the communicated clearance text.

TABLE 1.1

| Time | Clearance Text | Aircraft ID | FEATURES |
|---|---|---|---|
| 104543 | DEER VALLEY TOWER AERO NINE FOUR FOUR DELTA BRAVO WE ARE | Aircraft 1 | TOWER CONTACT |
| 104551 | AERO NINER FOUR FOUR DELTA BRAVO DEER VALLEY TOWER RUN RUNWAY SEVEN RIGHT CONTINUE TRAFFIC HOLDING POSITION | Aircraft 1 | CONTINUE TRAFFIC HOLD Runway 07R |
| 104554 | RUNWAY SEVEN RIGHT CONTINUE AH | Aircraft 1 | Runway 07R |

In various embodiments, the processing in the next or second stage aggregates in part the timing data to provide a different contextual presentation of the aircraft state based on a defined taxonomy. For example, in table 1.2 below, when the aircraft are taking off, communication of the cleared to takeoff time is provided as well as the time at the runway, time of tower contact and other parameters of the aircraft state. This provides a complete view of the state of clearance of all aircraft in the line-up for take-off to the pilots and ground controllers based on the voiced clearances. In addition, based on the voice clearances, the expected time on the runway and taxiway are determined by the context generator processing unit 140 of FIG. 1. The particular contextual view presented is not limited and can be changed accordingly. That is, the display may be configured in a variety of ways with different descriptors and taxonomies based on the timings of clearances of the cleared to takeoff to provide different complete contextual views if desired by the pilot, controllers etc.

TABLE 1.2

| | | | | Aircraft Taking Off | | |
|---|---|---|---|---|---|---|
| Aircraft Id | Tower Contact | Taxiway | Runway | Cleared to Takeoff | Approach | Other Params |
| Aircraft 1 | 10:49:20 AM | | 10:49:20 AM | 10:50:42 AM (1 min 22 secs) | Change if Luke | LUKE Approach Closed |
| Aircraft 2 | 10:56:10 AM | | 10:57:18 AM | 10:58:10 AM 2 mins | | LINE UP AND WAIT |
| Aircraft 3 | 10:47:22 AM | | | 10:50:02 (2 mins 40 secs) | | Tower 120.2 |
| Aircraft 4 | 10:53:12 AM | | | 10:53:23 AM (11 secs) | 10:55:03 AM (1 min 19 secs) | Tower 120.2 |
| Aircraft 5 | 10:53:46 AM | | | 10:54:26 AM 40 secs | 10:59:42 AM (6 mins) | Altimeter 30.06 Wind Calm LUKE APPROACH CLOSED SUGGEST PHOENIX APPROACH 120.7 |
| Aircraft 6 | 10:46:00 AM | 10:46:03 AM (3 secs) | | 10:46:12 AM (12 secs) | 10:48:03 AM (2 min 3 secs) | |

In various embodiments, for a landing phase of the aircraft (table 1.3 below), the context generator processing unit 140 generates approach times, times of cleared to land, go around times and other parameters based on the voiced communications with control tower. A table is created and prioritized on the cleared to land times for each of the aircraft. A contextual view is provided of the state and phase of all the aircraft landing at the destination point airport within the region of interest and within a particular time for the

TABLE 1.3

| | | | | Aircraft Landing | | | |
|---|---|---|---|---|---|---|---|
| Aircraft ID | Tower Contact | Approach | Traffic Hold | Cleared to Land | Go Around/MA | Taxiway | Other Params |
| Aircraft 1 | 10:45:43 AM | | Yes (8 secs) | 10:45:51 AM 8 Secs | | Charlie 07 | Wind 210 at 3 |
| Aircraft 2 | 10:43:38 AM | 10:43:38 AM (5 mile final) | | 10:47:52 AM (4 mins 14 secs) 10.50.50 AM Landing - 7 mins 12 secs Go Around - (1 mins 43 secs) | 10:49:07 AM Right Offset | | |
| Aircraft 3 | 10:53:56 AM | | | 10:54:35 AM 39 secs | | 10:57:49 AM Charlie 07 (3 mins 14 secs) | |
| Aircraft 4 | 10:42:00 AM | 3 miles Final | | 10:42:04 (4 secs) | | | |
| Aircraft 5 | 10:42:45 AM | 10 miles Final 3400 ft. | | 10:47:00 AM (4 min 15 secs) | | Charlie 07 | Follow | pilot and/or controllers to have a contextual view of the landings that are occurring.

Additional context actions of aircraft go arounds, aircraft on the taxi and aircraft in hold patterns is provided.

In various embodiments, a third stage of the context generating processing unit 140 of FIG. 1 of a statistical or aggregated display is presented. For example, as shown by the table 1.4 below, statistical or summary information is aggregated for a takeoff type presentation of data of aircraft in a taxi state, a takeoff state, a departure state and an average time for each of the states. Additional notes may also be provided.

The table 1.4 provides a comprehensive view to the pilot or controllers of summaries and statistics at the airport along with precise average times of delays, and times to takeoff or departure. In other words, based on the voice clearance communications, more precise averages are calculated and provided in a more comprehensive view for display.

TABLE 1.4

(Below)
Airport - Deer Valley (KDVT)
Takeoff Statistics (Current)

| Cleared To | Taxi | Takeoff | Departure |
|---|---|---|---|
| # Aircraft | 2 | 1 | 2 |
| Average Time | No delay | 1 min 10 secs | 9 mins 3 secs |
| Notes | Tower 120.2 LUKE APPROACH CLOSED USE SKY HARBOUR APPROACH WIND CALM | | |

When you arrive
20 Takeoffs in the next 2 hours
Departure BNYRD - #6 Aircraft
Expected ENGINE START delay - 5 mins
Expected TAKEOFF CLEARANCE Delay - 3 mins In various embodiments, similar kinds of statistics can be provided for landing statistics at the airport as shown by the table 1.5 below. That is, based on an arrival period, statistical aggregations of the aircraft in the hold state, long final state, short final state, land state and go around state may be provided. A comprehensive view of the current landing statistics of the airport can be gleaned based on the clearance communications and extracted information.

TABLE 1.5

Airport - Deer Valley (KDVT)
Landing Statistics (Current)

| Cleared To | Hold | Long Final | Final | Short Final | Land | Go Around | Total |
|---|---|---|---|---|---|---|---|
| # Aircraft | 2 | 5 | 3 | 2 | 2 | 1 | 15 |
| Average Time | 8 secs | 5 mins | | | 3 mins | 1 min 43 secs | |
| Notes | Charlie 07 Taxiway for RWY 07R RNAV RWY 25L - 3 aircraft RNAV RWY 7R - 3 aircraft | | | | | | |

When you arrive
15 Arrivals in the next 1 hour
RNAV RWY 25L - 5 aircraft
RNAV RWY 7R - 3 aircraft
Expected Clearance to Land - 5 mins
Expected Taxiway Clearance -1 min In various embodiments, the first, second and third stages provides a model, generated by the context generator processing unit 140, of operations of an airport to a pilot during an arrival or a departure of the aircraft. That is, various phases of other aircrafts that are within the coverage of the received transmissions of the receiver which scans multiple available channels are modeled in a table that provides a comprehensive view of aircrafts taking off and landing to the pilot. The table of various phases during a takeoff or a landing provides a model to the pilot of the airport operations. In addition, from the clearance information, further modeling of airport operation can be generated such as by correlating calculated transition times and derived statistical historic transition times for a best fit transition time; by deriving other statistical data not limited to number of aircrafts in different phases of flight; by deriving average time for transitioning from a particular phase such as a phase 1 to a phase 2; by deriving phases which are controlled or instructed by the air traffic controller; by deriving phases which are not controlled by air traffic controller but by a ground system; by deriving a number of times an aircraft has to communicate with the air traffic controller and time required for such communications to transition from phase one to another; by deriving aircrafts which are using the radio channel and thus controller's time for a longer period; by deriving which runways are used, which taxiways are used, the time consumed by aircrafts on runways and taxiways; and by deriving radio frequencies used for different phases of flight.

In various embodiments, the context generator unit 140 includes instructional code for performing a variety of functions including recording historical data, determining various analytics for airport operations, and generating prediction data as a result of the analytics and data captured. In various exemplary embodiments, the context generator unit 140 can include code for calculating the transition times based on a receipt time processed from the clearance information matched with transition time periods of a pre-built timer table; code for determining a flight phase based on contextual processing of at least the clearance information which has extracted; code for calculating transition times based on a receipt time extracted from the clearance information correlated with transition time periods of the pre-built timer table, and a start/stop time by a timer based on trigger words related to transition times in the flight phase extracted from the clearance information; code for deriving statistical data of prior recorded historic transition times within the coverage area; code for correlating calculated transition times and recorded historic transition times for a best fit transition time; and code for deriving other statistical data not limited to a number of aircrafts in different flight phases; code for deriving flight phases which are instructed by air traffic control; code for deriving flight phases which have not been instructed by the air traffic control; code for deriving analytics of communications with the air traffic control; code for deriving analytics of runways used, taxiways used, time in the runways and taxiways; code for deriving radio frequencies used by aircrafts for different flight phases of flight; code for deriving prediction data of cleared arrival routes, departure routes, and taxi routes; code for deriving waiting time to receive clearance information for a gate, a taxi, a takeoff, and a landing; code for predicting one or times related to transitions of flight phases by associating a time period of the flight phase with a pre-built timer table of time periods for transition of each phase of a flight wherein the transitions of the flight phases comprise on or more of a set of flight phase of: waiting, holding and arrival flight phases; code for deriving occupancy rates of runways, taxiways and gates over a time period; and code for deriving segments of ground paths requiring permission to traverse.

Figure 4:
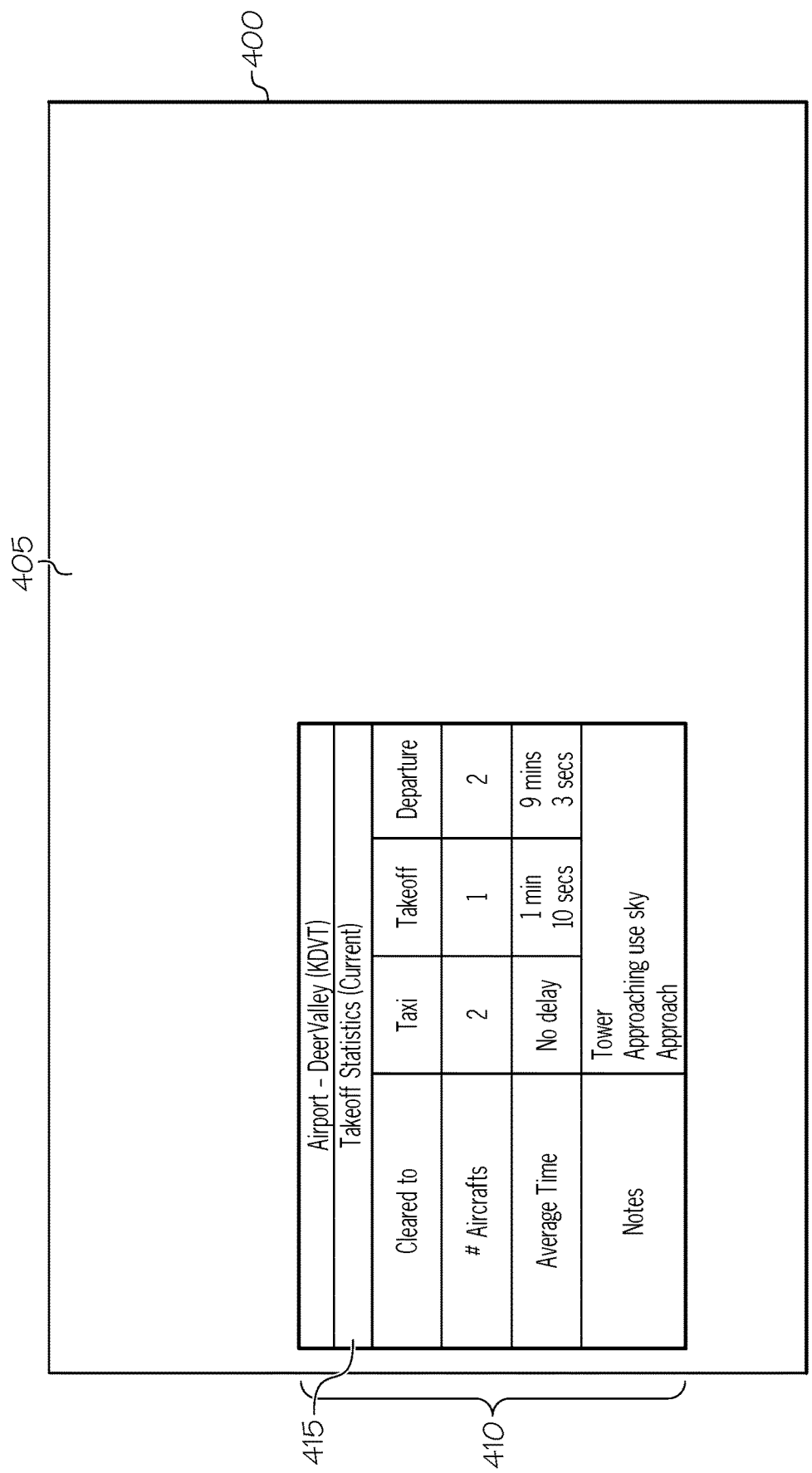
FIG. 4 is an overlaid information box on a display diagram of an exemplary predictive phase transition time system in accordance with the disclosed embodiments.

With a reference to FIG. 4 an illustration of the operation of the predictive phase transition time system in accordance with an exemplary embodiment. FIG. 4 illustrates a graphic user interface 400 of an airport contextual display of an aircraft in a takeoff phase. An information box 410 overlaid on a contextual display 405 of an origination airport is shown.

The information box 410 displays information of the "airport name", current statistical information 415 of takeoffs of aircraft from the airport. The statistical information 415 includes aggregated stats of the number of aircraft in a taxi phase, in a takeoff phase and in a departure phase. Associated with each of the phases is an average time for each phase of "no delay" for the taxi phase and calculated time delays for the takeoff and departure phase. A "note" section is also included in the information box 410 for providing related particular information. In exemplary embodiments, the information box 410 may be over-laid on a view of an Airport Moving Map System (AMM), which is a synthetic view application which illustrates on the display airport features like runways, taxiways, aprons, ground traffic, airport structures etc.

Figure 5:
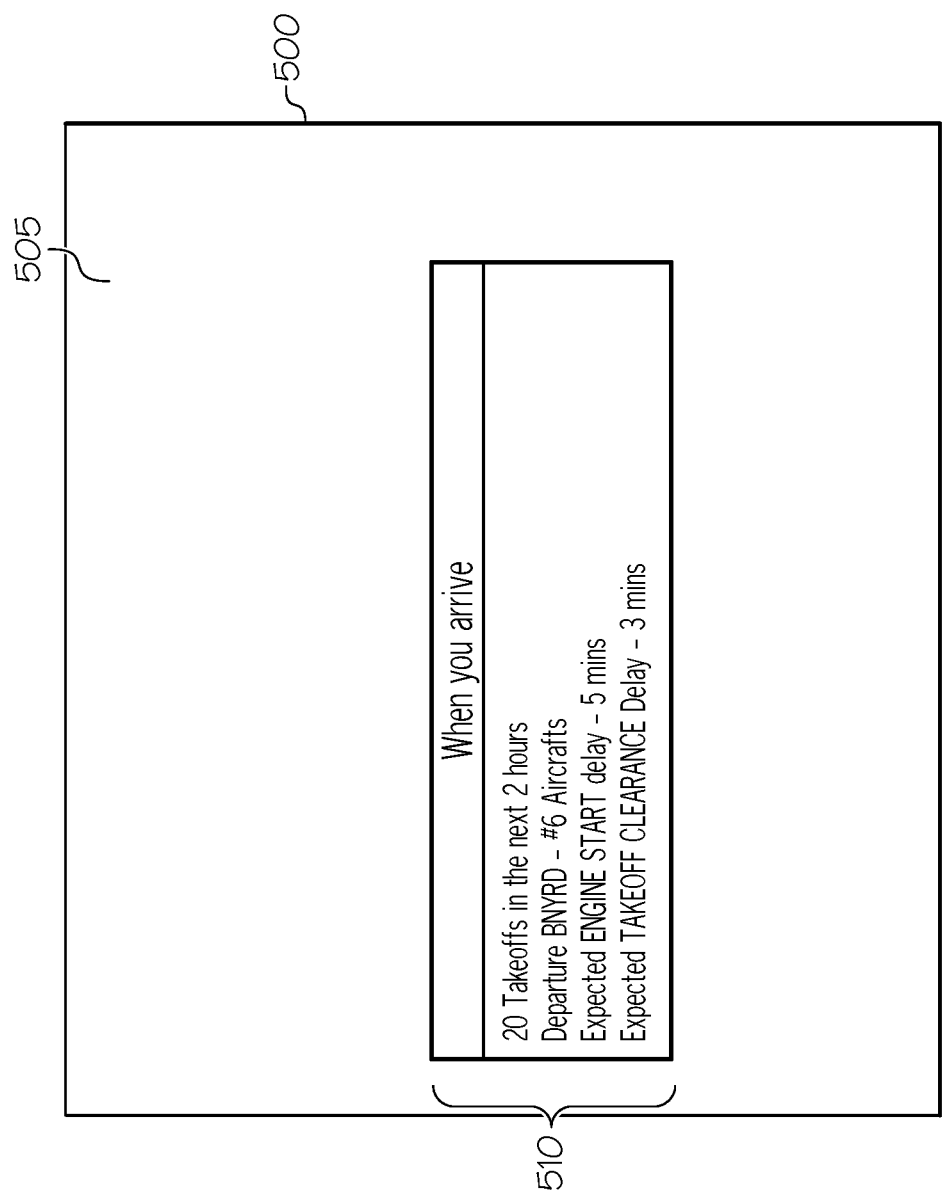
FIG. 5 is an overlaid information box on a display diagram of an exemplary predictive phase transition time system in accordance with the disclosed embodiments.

FIG. 5 is an illustration of the operation of the predictive phase transition time system in accordance with an exemplary embodiment. FIG. 5 illustrates a graphic user interface 500 of an airport contextual display of an aircraft in a landing phase. An information box 510 overlaid on a contextual display 505 of a destination point airport is shown. FIG. 5 shows in the information box 510 arrival information aggregated based on recorded clearance times from communications between the ATC and various aircraft. The information box 510 describes 20 takeoffs in the next 2 hours, departure of a particular aircraft, expected engine start delay, expected takeoff clearance delay etc. That is, the information is aggregated and contextually displayed in a manner appropriate to a particular ownship during an arrival phase. The contextual information is added to the aggregated statistical data by application solutions of the content generator processing unit 140.

FIG. 6 is another illustration of illustration of the operation of the predictive phase transition time system in accordance with an exemplary embodiment. FIG. 6. illustrates a graphic user interface 600 of an airport contextual display of an aircraft in a landing phase in which an information box 625 is layered on a satellite or radar map. The satellite or weather map may also show weather related information to the pilot. The information box 625 includes current landing statistics that are available at the destination airport within the vicinity. In addition, notes are included that provide helpful insight to the pilot of aircraft landing on a particular runway as well as the current hold, long final, short final, land and go around numbers for all the aircraft in the vicinity and the average calculated times for the respective categories based on the monitored clearance communications.

Figure 7:
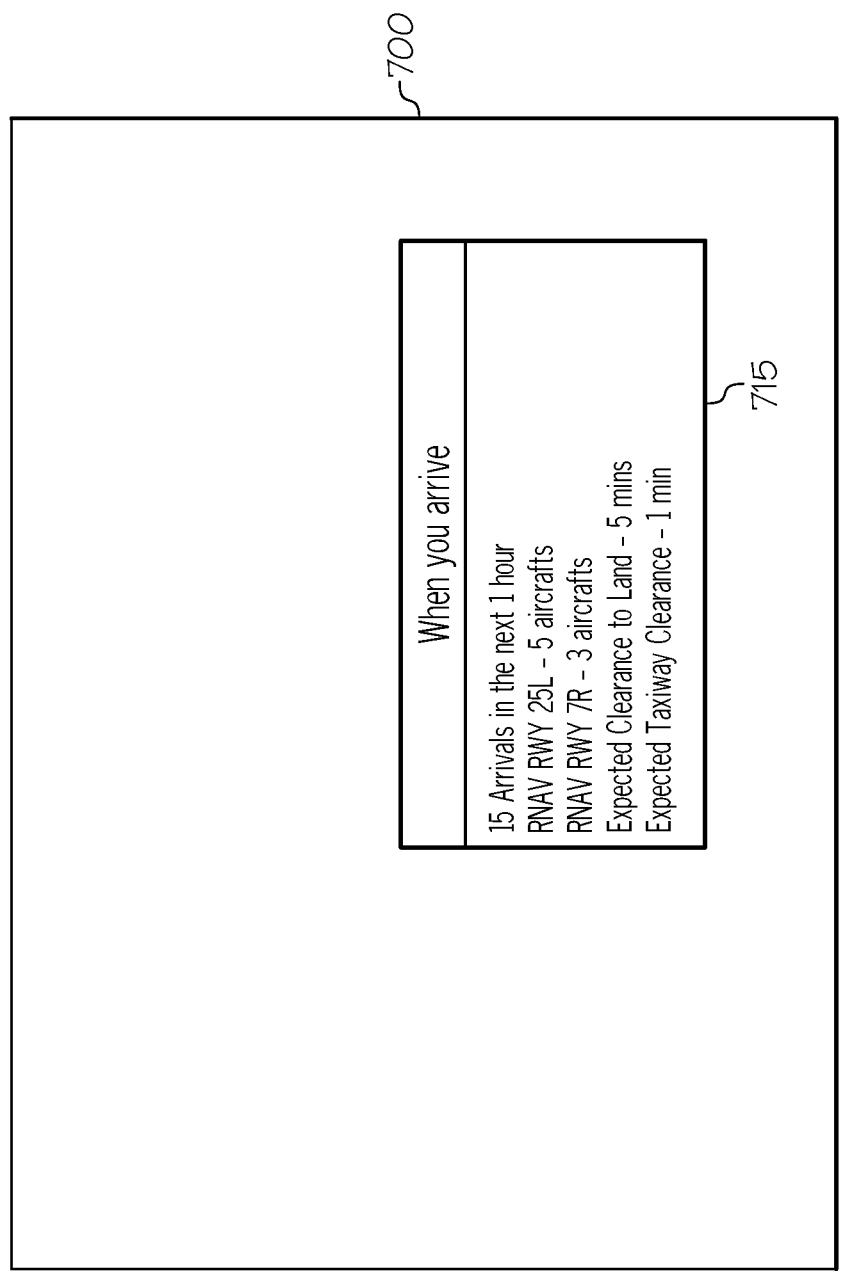
FIG. 7 is an overlaid information box on a display diagram of an exemplary predictive phase transition time system in accordance with the disclosed embodiment.

FIG. 7 is another illustration of illustration of the operation of the predictive phase transition time system in accordance with an exemplary embodiment. FIG. 7. illustrates a graphic user interface 700 of an airport contextual display of an aircraft in a landing phase in which an information box 715 is layered on a synthetic map 705 of the destination point airport. The information box 715 includes statistical arrival information of all the aircraft as well as expected clearance to land and expected taxi clearance times based on the clearance communications monitored.

In various embodiments, a database, a text file, a XML file or a JSON or any tailored proprietary format etc. may be used for gathering, collecting, or sharing data associated with the timing data and other data of the predictive phase transition time system.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for more determining airport operations based on radio communications, the method comprising:
   configuring a receiver of an aircraft to scan communication channels of different radio frequencies related to transmissions between air traffic control (ATC) and a set of aircrafts to determine one or more communication channels associated with the set of aircrafts in a coverage area to enable the receiver to monitor and receive air traffic control (ATC) communications of the set of aircraft; and
   processing, by a conversation extractor unit, the ATC communications to extract clearance information in the ATC communications, and to associate the clearance information with an identifier with each aircraft to create a table of timings of the clearance information to a particular aircraft with the identifier providing a view of airport operations.

2. The method of claim 1, further comprising:
   determining, by a context generator processing unit, either a flight phase of each aircraft or a time spent in a flight phase based on contextual processing of the clearance information in order to determine at least a current flight phase of the aircraft.

3. The method of claim 2, the context generator processing unit further comprising:
   calculating the transition times of a particular flight phase based on the time spent in a particular flight phase.

4. The method of claim 3, the context generator processing unit further comprising:
   executing a start and a stop action of a timer based on trigger words to measure transition times wherein the trigger words are semantically processed from the clearance information.

5. The method of claim 4, the context generator processing unit further comprising:
   averaging transition times to display likely or a best fit transition time for a particular transition phase.

6. The method of claim 5 wherein the transition times comprise at least one or more of a set of departure or arrival clearance information of aircrafts related to airport operations.

7. The method of claim 6 wherein the arrival transition times comprise: at least one or more of a set of transition times related to hold, final, and go around clearance information.

8. The method of claim 6 wherein the takeoff transition times comprises: at least one or more of a set of transition times related to taxi, runway, and cleared to takeoff clearance information.

9. The method of claim 1 wherein the context information comprises: descriptive operational context information of the vicinity wherein the vicinity comprises: a destination or departure airport and alternate destination airports.

10. The method of claim 1, further comprising:
    displaying, by a graphic user interface, the identifier of each aircraft of the set of aircrafts, and associated flight phase, current transition time, expected transition time, and best fit transition time to enable comparisons of transition time of flight phases of the set of aircrafts.

11. A system for determining airport operations based on radio communications, the system comprising:
    a receiver of an aircraft configured to scan communication channels of different radio frequencies related to transmissions between air traffic control (ATC) and a set of aircrafts to determine one or more communication channels associated with the set of aircrafts in a coverage area, and to monitor and receive air traffic control (ATC) communications of the set of aircraft; and
    a conversation extractor unit configured to process the ATC communications, to extract clearance information in the ATC communications, and to associate the clearance information with an identifier with each aircraft to create a table of timings of the clearance information to a particular aircraft with the identifier in order to provide a view of airport operations based on the clearance information.

12. The system of claim 11 further comprising:
    the context generator processing unit configured to perform the operations of:
    determining either a flight phase of each aircraft or a time spent in a flight phase based on contextual processing of the clearance information in order to determine at least a current flight phase of the aircraft.

13. The system of claim 12 wherein the context information comprises: descriptive operational context information of the vicinity wherein the vicinity comprises: a destination or departure airport and alternate destination airports.

14. The system of claim 11, further comprising:
the context generator processing unit configured to perform the operations of:
calculating the transition times of a particular flight phase based on the time spent in a particular flight phase.

15. The system of claim 14, further comprising:
the context generator processing unit configured to perform the operations of:
averaging transition times to display likely or a best fit transition time for the particular transition phase.

16. The system of claim 15 wherein the arrival transition times comprise: at least one or more of a set of transition times related to hold, final, and go around clearance information.

17. The system of claim 11, further comprising:
a display unit configured to perform the operations of:
displaying, by a graphic user interface, tail information of each aircraft of the set of aircraft, and associated flight phase, current transition time, expected transition time, and best fit transition time to enable comparisons of transition time of flight phases of the set of aircraft.

18. A non-transitory computer-readable medium storing a computer program product executable by a processor of a computer system for processing an object request, the non-transitory computer-readable medium comprising:
code for configuring, a receiver of an aircraft, to scan multiple communication channels of different radio frequencies related to transmissions between air traffic control (ATC) and a set of a plurality of aircrafts to determine one or more communication channels associated with the set of aircrafts in a coverage area to enable the receiver to monitor and receive air traffic control (ATC) communications of the set of aircrafts;
code for processing, by a conversation extractor unit, the ATC communications to extract clearance information in the ATC communications, and to associate with an identifier with each aircraft to create a table of timings of the clearance information to a particular aircraft identified by the identifier;
code for determining, by a context generator processing unit, a flight phase of each aircraft based on transition times and by contextual processing of the clearance information; and
code for presenting, by a display unit, a view of each flight phase and transition time with context information about the flight phase in the coverage area.

19. The non-transitory computer-readable medium of claim 18 further comprising:
code for calculating the transition times based on a receipt time processed from the clearance information matched with transition time periods of a pre-built timer table;
code for determining a flight phase based on contextual processing of at least the clearance information which has extracted;
code for calculating transition times based on a receipt time extracted from the clearance information correlated with transition time periods of the pre-built timer table, and a start/stop time by a timer based on trigger words related to transition times in the flight phase extracted from the clearance information;
code for deriving statistical data of prior recorded historic transition times within the coverage area;
code for correlating calculated transition times and recorded historic transition times for a best fit transition time; and
code for deriving other statistical data not limited to a number of aircrafts in different flight phases.

20. The non-transitory computer-readable medium of claim 19 further comprising:
code for deriving flight phases which are instructed by air traffic control;
code for deriving flight phases which have not been instructed by the air traffic control;
code for deriving analytics of communications with the air traffic control;
code for deriving analytics of runways used, taxiways used, time in the runways and taxiways;
code for deriving radio frequencies used by aircrafts for different flight phases of flight;
code for deriving prediction data of cleared arrival routes, departure routes, and taxi routes;
code for deriving waiting time to receive clearance information for a gate, a taxi, a takeoff, and a landing;
code for predicting one or times related to transitions of flight phases by associating a time period of the flight phase with a pre-built timer table of time periods for transition of each phase of a flight wherein the transitions of the flight phases comprise on or more of a set of flight phase of: waiting, holding and arrival flight phases;
code for deriving occupancy rates of runways, taxiways and gates over a time period; and
code for deriving segments of ground paths requiring permission to traverse.

* * * * *